March 2, 1965  G. C. KEMP  3,171,999
INSULATED MAGNETIC CORE
Filed Dec. 15, 1959

*INVENTOR.*
GREY C. KEMP
BY *James R. Campbell*
HIS ATTORNEY

United States Patent Office 3,171,999
Patented Mar. 2, 1965

3,171,999
INSULATED MAGNETIC CORE
Grey C. Kemp, Peterborough, Ontario, Canada, assignor to Canadian General Electric Company, Limited, Toronto, Ontario, Canada, a company of Canada
Filed Dec. 15, 1959, Ser. No. 859,667
Claims priority, application Canada, July 14, 1959, 778,553
5 Claims. (Cl. 310—270)

The invention described herein relates to dynamoelectric machines and more particularly to an improved arrangement for retaining sheet insulation in position on a magnetic core for a dynamoelectric machine.

In order to increase the current creepage distance between a winding and other parts of a dynamoelectric machine existing at different levels of potential, it has been customary to position an insulating material, such as glass cloth, over the part where it is desired to increase the creepage distance. The glass cloth or other pliable insulating material must be held firmly in position and in the past, this usually has been accomplished by utilizing small clamping plates which were located in a row along the edge of the insulating material and fastened to the machine so that the material could be held immovably therebetween. This practice constituted an expensive way of securing the insulating material in position because the costs were exceedingly high for the clamping plates and screws, and the time and labor involved in locating and fastening the plates to the machine. Another important drawback was that the clamps decreased the area otherwise available for insulation.

Other arrangements for fastening insulating material on the machine are well known, but they likewise, all tend to be expensive in both material and labor.

The primary object of my invention therefore is to provide an improved insulated magnetic core including a design for minimizing the establishment of current creepage paths to ground between the core winding and other parts of the core having lower electric potentials.

Briefly stated, by fastening or retention means utilizes a groove in the flange of a dynamoelectric machine armature or other part where a pliable sheet of insulation is to be secured. The insulation is placed in or across the groove and a cord or woven rope then pressed into the groove along with the insulation to form a wedge fit. In its preferred form, both the insulation and cord are treated with a thermosetting resinous composition which is caused to cure to a hard rigid mass for preventing later displacement of the insulation and effectively minimizing establishment of current creepage paths to ground.

While the specification concludes with claims particularly pointing out and distinctly claiming the subject matter which I regard as my invention, it is believed the invention will be better understood from the following description taken in connection with the accompanying drawing in which:

Figure 1:
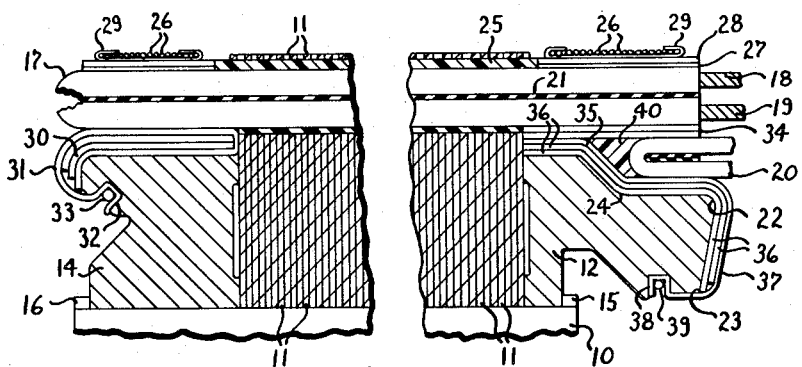
FIGURE 1 is a sectional view in elevation of an armature illustrating the cord-groove arrangement for securing the insulation in position.

Referring now to the drawing wherein like reference characters designate like or corresponding parts throughout the several views, there is shown an armature for a D.C. machine including the outer or peripheral portion of a spider 10 supported at its center by a shaft (not shown). A plurality of laminations 11 of magnetic material are mounted on the spider 10 and maintained under pressure by armature heads or flanges 12 and 14 disposed on opposite ends of the magnetic core. The heads may be secured to the spider 10 by any of the conventional means, such as bolts, keyways, welding, or the like, to prevent longitudinal or rotational movement of the laminations 11 relative to the spider 10. The securing means shown consists of a weld or boss 15 and 16 which may be used in conjunction with a keyway and key.

The armature core is equipped with slots for receiving coils 17 having their sides separated by insulation 21 and immovably held in position by slot wedges 25. The corresponding coil leads are connected to risers and commutator segments by conductors 18 and 19 in the usual manner. In order to minimize coil end turn displacement when the armature is placed in operation, a plurality of turns of steel wire 26 is wound circumferentially over the end turns in a well known manner. Insulation preferably consisting of mica mat tape 27 and varnished asbestos cloth 28 is interposed between the end turns and the turns of steel wire. Binding clips 29 hold the wire in position. Obviously, resin treated glass tape and other insulation may be substituted for the banding parts mentioned above.

An equalizer coil 20 has been included in the armature shown to illustrate how the invention may be used with an armature head having both concave and convex surfaces. For the purpose of this description, I consider the surfaces 22 and 23 to be convex, while the surface 24 is of concave configuration.

The improvement involved in this invention resides in securing insulation firmly on the surfaces of armature heads 12 and 14 for establishing a long current creepage path between the coils and iron of the armature core which are at different potentials during machine operation. The insulation applied to the peripheral surface of armature head 14 preferably comprises shingled mica 30 having an overlayer of glass cloth 31, or similar pliable fabric type of insulation. In order to secure the insulation on the head, a circumferential groove 32 of a size sufficient to accept the insulation is machined in the armature head 14 at a point remote from the coils and where the glass cloth 31 is to be fastened in position. The groove 32 may be located at any angle on any part of the head that is convenient for reception of the cloth.

After the glass cloth 31 is fitted closely over the head surfaces, it is pressed into groove 32, and a cord 33 or other cord-like fibrous member is pressed into the groove for holding the cloth in position. The frictional forces between the cord, cloth and walls of the groove in some cases, may be sufficient to hold the parts in position. When applied to a magnetic core for a dynamoelectric machine however, a more positive securing means is more desirable and in the particular form chosen for illustrating the invention, I have impregnated the cord with a thermosetting resinous composition which cures to a hard mass when subjected to heat. The composition has an affinity for both glass and metal, thereby effecting good bonding action with the cloth and walls of the grooves.

Figure 3:
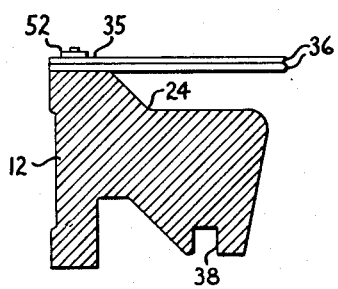
FIGURES 3 and 4 illustrate the steps followed in applying insulation to the armature head shown in FIGURE 1.

The armature head 12 is similarly insulated with layers of mica 34, or of mica and glass tape, or other suitable material, which lie between the lower side of coil 17 and equalizer coil 20. Glass tape 35 may be wrapped around the mica to help hold it in position as shown in FIGURE 3. Layers 36 of shingled mica and glass cloth 37, or similar insulation, extends over the peripheral surface of armature head 12, beneath equalizer coil 20 and side portion of head 12 prior to being inserted in groove 38. A resin treated glass cord 39 is employed for holding the insulation in position as previously described. A plastic material 40 fills the space at the end of equalizer coil 20.

The procedure used in applying the creepage insulation will be described in connection with the armature head 12. It will be obvious that with a few changes, the application technique will be the same for armature head 14.

Before the installation of the main and equalizer windings, a first temporary clamping band 52 is applied over the armature head 12 and positioned adjacent the laminations 11, as best shown in FIGURE 3. Shingled mica is formed to the contour of the armature head by hand and secured with a few turns of glass tape 35 prior to being clamped between the band 52 and the head itself. The glass tape also may be used conveniently for conforming the mica to other parts of head 12.

Figure 4:
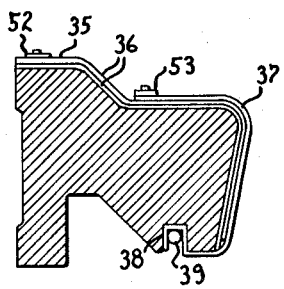

Referring now to FIGURE 4, a layer of bias cut glass cloth 37, preferably impregnated with a thermosetting resinous composition, is applied over the mica insulation and a second temporary clamping band 53 installed at the concave surface 24 for holding the mica 36 and cloth 37 in position. Although the glass cloth 37 is shown as terminating at one end under clamping band 53, it will be obvious that it could be extended to clamping band 52 on the outer extremities of the head. Only one clamping band is necessary when applying insulation to armature head 14 because the insulation naturally follows the contour of the head.

With the glass cloth 37 pulled around the armature head and covering groove 38, a cord 39 is then tapped into the groove with a suitable tool. Final tightening of the glass cloth is achieved by driving the cord to the bottom of the groove using a rounded fibre drift and mallet.

The glass cloth may or may not be treated with a thermosetting resin, but in either event, the insulated head assembly is placed in an oven and baked for a time sufficient to set the resinous composition.

Upon removal from the oven, the two temporary clamping bands 52 and 53 are stripped from the armature head. The removal of the clamping bands 52 and 53 may be made easier if the bands are coated with paraffin wax prior to clamping them on the head. The surface of the glass cloth may be cleaned with a thinner and the remaining steps of assembling the armature will follow in the normal manner.

As indicated previously, it is preferable, although not necessary, to treat the cord with a thermosetting resinous composition. The function performed by such a composition is that of imparting rigidity to the cord for preventing its inadvertent removal from the groove and consequent loosening of the insulation. Many thermosetting and thermoplastic compositions are available for this purpose including cold set epoxy and polyester resins.

Although many different types of resins may be used for carrying out the functions of the resin mentioned above, I have found the following resin to be especially suitable since it consists of a combination of a high polymeric material, such as polyvinyl formal or other polyvinyl resins, and a heat reactive thermosetting polyester resin is used as the impregnating composition. By a high polymeric material is meant a resinous material of high molecular weight which is in its final state of polymerization or condensation, and which, upon being cast from solution, yields products of high tensile strength and toughness.

The use of a high polymeric solid material imparts toughness to the thermosetting resin which is usually brittle, and consequently results in a fiber reinforced structure which withstands the shocks, vibrations, and bending streses encountered during use. Examples of such high polymeric materials and particularly polyvinyl resins, which may be used in the practice of this invention, may be found in U.S. Patent 2,307,588—Jackson et al. assigned to the assignee of the present invention, and Reissue Patent 20,430—Morrison et al.

The following impregnating composition has been found to be effective to accomplish the desired results: (1) a polymerizable unsaturated alkyd resin obtained by the esterification reaction of a mixture of ingredients comprising a polyhydric alcohol and an alpha unsaturated alpha-beta polycarboxylic acid, e.g., diethylene glycol maleate; (2) a copolymerizable different monomer, e.g., styrene, polyesters compatible with the above unsaturated alkyd resin obtained by esterification of allyl alcohol with a polybasic acid, specifically a polycarboxylic acid, e.g., diallyl phthalate, etc. in the ratio, by weight, of about 1 part to 1 to 3 parts of (1); (3) a catalyst for accelerating the copolymerization of the ingredients of (1) and (2), e.g., benzoyl peroxide; (4) a polyvinyl acetal resin, specifically a polyvinyl formal resin, in an amount corresponding to from 15 to 75 percent, by weight, of the total of (1), (2) and (4); (5) a volatile solvent for the ingredients of (1), (2) and (4), e.g., ethylene dichloride, a mixture of ethyl alcohol and 1-nitropropane, a mixture of ethyl alcohol and toluene, etc.; and (6) an inhibitor such as quinone or hydroquinone in an amount of approximately .001 percent to .01 percent of the weight of the reactive materials of (1) and (2). The amount of solvent to be used is between 5 and 20, preferably 10, times the amount of the polyvinyl formal resin in the composition.

It will be evident that other properly formulated thermosetting resins such as phenolics, epoxies, or silicones, may be substituted for the resin described above providing they display substantially the same properties as that previously mentioned.

Obviously, this same technique applied to the flange insulation of an induction or other motors having an insulated winding.

Figure 2:
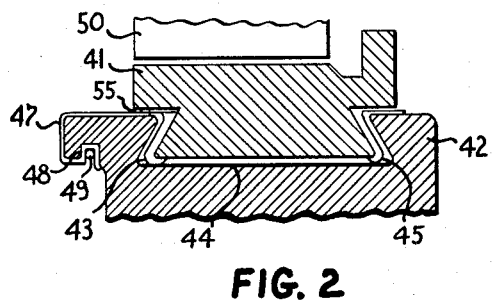
FIGURE 2 is a sectional view in elevation showing application of the inventive teachings to a commutator.

As a second example of the retention means of my invention, reference to FIGURE 2 shows a partial section through a commutator including a carbon brush 50. Commutator segments 41 shaped to the configuration shown are held in place by a commutator clamp ring 42. The distances between the segments 41 and clamp ring 42 as well as certain other normally small distances have been exaggerated to better illustrate the construction. Mica strips 43, 44 and 45 insulate the commutator segments 41 from the clamp ring 42. To extend the creepage distance, a sheet of glass cloth 47, or other suitable insulation, is positioned between the segments 41 and clamp ring 42 and around the end of the clamp ring to a groove 48. A cord 49, or other cord-like fibrous member, is pressed into the groove with cloth 47 for securing the cloth in position in the same manner as that previously described. A seal 55 may be used to seal the junction of the ring 42 and segment 41 and prevent dust and small foreign particles from getting under the segments.

Application of the insulation is basically the same as that described in connection with FIGURE 1. Thus, the glass cloth 47, which may previously have been impregnated with a thermosetting resinous composition, is clamped in place at seal 55. The cloth is then pulled around the end of the clamp ring and placed over groove 48. Cord 49 is tapped into the groove and the cloth 47 tightened by driving the cord 49 to the bottom of the groove. In the preferred embodiment the sash cord is then painted with a thermosetting resinous material and the clamp ring and commutator assembly placed in an oven at a temperature and for a time sufficient to set the resinous composition. It is obvious that the same procedure can be used to insulate the opposite flange 42.

It will be seen that I have devised a simple and inexpensive arrangement for fastening cloth insulation in position and that my fastening method and apparatus enables the cloth to be drawn tighter than with the prior means using metal clamps.

It will be evident that many modifications and variations are possible in light of the above teachings. It therefore is to be understood that within the scope of the appended claims, the invention may be practiced otherwise than as specifically described.

What I claim as new and desire to secure by Letters Patent of the United States is:

1. An electrical device comprising a magnetic core including a plurality of laminations and current carrying conductors therein, means on each end of the core holding said laminations in alignment and under pressure, insulation on said means for extending the current creepage path between said conductors and said means which exist at different voltage potentials, an indentation on said means for receiving a portion of said insulation, and a device holding said insulation in the indentation for preventing loosening thereof when the core is placed in operation.

2. A magnetic core comprising a plurality of laminations having current carrying coils therein, end turns on said coils overhanging said laminations, circular rings respectively positioned on opposite ends of the laminations and under said end turns for holding the laminations against displacement, insulation on said rings extending from a point adjacent said laminations to a remote area on said rings for extending the current creepage path between the coils and other parts of the core, grooves on said rings for receiving said insulation, and an initially flexible fibrous member treated with a resinous composition holding said insulation in said grooves.

3. The combination according to claim 2 wherein the initially flexible fibrous material is impregnated with a thermosetting resinous composition capable of curing to a hard rigid mass in the presence of heat.

4. An armature for a dynamoelectric machine comprising a pair of oppositely disposed armature heads enclosing therebetween a plurality of stacked laminations having coils comprising a winding therein, a sheet of pliable fabric-like insulation for each of said heads, a first fastening means provided to fasten said insulation between said coils and said heads, and a second fastening means comprising an annular groove in each of said armature heads located a distance from the head peripheral surface and defining with said first fastening means an area which said insulation covers and a cord coated with a thermosetting material seated over said insulation in said groove, the diameter of said cord being such that the cord and the insulation are wedged in said groove.

5. The combination according to claim 4 wherein said fabric-like insulation comprises glass cloth insulation.

References Cited by the Examiner

UNITED STATES PATENTS

| | | | |
|---|---|---|---|
| 2,320,886 | 6/43 | Hill | 310—215 |
| 2,501,232 | 3/50 | Mesh | 310—269 |
| 2,519,219 | 8/50 | Baudry et al. | 310—270 |
| 2,583,804 | 1/52 | Andrus | 310—71 X |
| 2,602,829 | 7/52 | Fromm et al. | 29—155.53 |
| 2,749,456 | 6/56 | Luenberger | 310—43 |
| 2,788,052 | 4/57 | Shulman | 154—2.6 |
| 2,792,871 | 5/57 | Dorgan | 154—2.6 |
| 2,870,357 | 1/59 | Vandenberg et al. | 310—269 |
| 2,990,488 | 6/61 | Schafer | 310—235 |

MILTON O. HIRSHFIELD, *Primary Examiner.*

ORIS L. RADER, *Examiner.*